United States Patent
Negishi et al.

(10) Patent No.: US 6,597,865 B1
(45) Date of Patent: Jul. 22, 2003

(54) FILM UNIT WITH WATERPROOF LENS AND WATERPROOF RING

(75) Inventors: Kenji Negishi, Kanagawa (JP); Hirofumi Katsura, Kanagawa (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 0 days.

(21) Appl. No.: 09/856,777

(22) PCT Filed: Nov. 19, 1999

(86) PCT No.: PCT/JP99/06459

§ 371 (c)(1),
(2), (4) Date: May 25, 2001

(87) PCT Pub. No.: WO00/31585

PCT Pub. Date: Jun. 2, 2000

(30) Foreign Application Priority Data

Nov. 25, 1998 (JP) .......................... 10-333938
Dec. 25, 1998 (JP) .......................... 10-369537

(51) Int. Cl.⁷ .................... G03B 17/08; G03B 11/04
(52) U.S. Cl. ................... 396/25; 396/29; 396/543
(58) Field of Search ..................... 396/25, 27, 29, 396/543, 6; 277/626, 644, 647

(56) References Cited

U.S. PATENT DOCUMENTS

| | | | | | |
|---|---|---|---|---|---|
| 3,640,424 A | * | 2/1972 | Ando | .......................... | 396/25 |
| 5,239,324 A | * | 8/1993 | Ohmura et al. | ................. | 396/27 |
| 5,758,200 A | * | 5/1998 | Inoue et al. | ................... | 396/25 |
| 5,812,887 A | | 9/1998 | Nomura et al. | ................ | 396/72 |
| 6,014,522 A | * | 1/2000 | Reber, II | ...................... | 396/29 |
| 6,466,741 B2 | * | 10/2002 | Uchiyama | .................... | 396/25 |

FOREIGN PATENT DOCUMENTS

| JP | 4-116837 | 10/1992 |
|---|---|---|
| JP | 5-142703 | 6/1993 |
| JP | 5-188457 | 7/1993 |
| JP | 6-82897 | 3/1994 |
| JP | 8-24749 | 10/1996 |

* cited by examiner

Primary Examiner—Christopher Mahoney
(74) Attorney, Agent, or Firm—Young & Thompson

(57) ABSTRACT

By pushing down a shutter release operation member (9), that is mounted on a front of a waterproof case of a waterproof type lens-fitted photo film unit, a release lever (70) is caused to rotate through a rotary shaft (71) that is put through a front wall of the waterproof case. Thereby, the release lever directly pushes an arresting member (59) through an opening (19c) provided on a front side of a unit body (3), releasing a shutter drive member (51) as having been arrested in a cocked position by the arresting member (59), and thus causing a shutter blade (45) to make an open-close movement. The waterproof case consists of a pair of case members that are put on the unit body from its front and rear sides, and are joined to each other by engagement. An elastic waterproof ring is force-fitted in a gap of the joint between the case members. The waterproof ring has a substantially semicircular sectional contour, and is provided with a ridge on a flat surface portion on the opposite side from a curved surface portion.

12 Claims, 10 Drawing Sheets

FILM UNIT WITH WATERPROOF LENS AND WATERPROOF RING

FIELD OF THE ART

The present invention relates to a waterproof lens-fitted photo film unit. The present invention relates also to a waterproof ring, especially a waterproof ring for use in a waterproof case of the waterproof lens-fitted photo film unit.

BACKGROUND ARTS

The lens-fitted photo film units, which are preloaded with film and provided with simple photographic mechanisms, are widely used in general, because of handiness and low prices. Also, waterproof lens-fitted photo film units (hereinafter referred to as waterproof film units) have been brought into markets. The waterproof lens-fitted photo film unit is encased in a waterproof casing having a watertight structure, and permits operating it from outside the waterproof case for photography, so it is usable in the water.

An exemplary of the waterproof lens-fitted photo film unit is disclosed in Japanese Laid-open Patent Application No. 5-188457, wherein a waterproof case covers up a unit body configured substantially equivalent to a conventional lens-fitted photo film unit. In terms of handling properties in the water, a relatively large operation member is provided on a front side of the waterproof case, such that rotating the operation member causes a releasing member, that is provided inside the waterproof case, to press a shutter button of the unit body. Since the operation member is provided on the front side of the waterproof case, the positions the photographer's fingers holding the waterproof lens-fitted photo film unit are so limited that the fingers are prevented from entering the photographic field and being photographed. Besides, shutter-releasing is done without fail just by sliding the finger on the front surface of the waterproof case.

The operation member is coupled to the releasing member through a rotary shaft that is put through a front wall of the waterproof case. The releasing member is bent around to reach a top side of the unit body, so the tip of the releasing member is located on the shutter button that is provided on the top side of the unit body. When the operation member is pushed down and rotates, the releasing member rotates, and the tip presses the shutter button to take a photograph.

To provide a space for allowing the tip of the releasing member to move is provided on the top side of the above conventional waterproof lens-fitted photo film unit, a corresponding part of a top wall of the waterproof case is protruded upward. The protrusion of the top side of the waterproof case worsens the appearance.

As an example, the waterproof case consists of a case main body for containing the lens-fitted photo film unit, and a lid for closing an opening formed through the case main body. A gasket ring is fitted in a gland formed around a rim of the opening of the case main body,. After the unit body is inserted in the case main body, the lid is put over and fixed to the opening of the case main body. Then the waterproof ring is nipped in a gap between the rim of the opening and the lid, so the opening is closed in a watertight fashion.

The waterproof ring is usually a rubber ring with a round sectional contour. However, the waterproof ring having a round section is apt twist when it is large enough for the opening that permits putting in and taking off the lens-fitted photo film unit or a camera through it, and thus disadvantageous in assembling. Moreover, since the waterproof rings have conventionally been formed individually by a metal mold, the conventional waterproof rings are pretty expensive. As a waterproof ring that overcomes these disadvantages, one having a substantially semicircular sectional contour is getting widely used these days. As having a flat surface, the waterproof ring with the approximately semicircular section (hereinafter referred to as the semi-cylindrical type waterproof ring) is inapt to twist and can be formed by cutting off from a semi-product of a cylindrical tubular shape, that saves the manufacture cost.

On the contrary, if a contact plane with which the flat surface of the semi-cylindrical type waterproof ring is brought into contact with is flat, pressures are distributed, so it is impossible to obtain a sufficient water shielding effect. For this reason, the contact plane has to be previously formed with a ridge. However, such a ridge must protrude substantially perpendicularly to a direction of pulling the metal mold off the case main body or another member in which the waterproof ring is fitted. Therefore, providing a ridge on the contact plane results in complicating the metal mold and thus rising the cost. Furthermore, even a little unevenness of the ridge on the contact plane will provide gaps between the ridge and the flat surface of the semi-cylindrical type waterproof ring, and lower the water shielding effect.

The present invention is made in view of the above described facts, and has an object to provide a waterproof lens-fitted photo film unit that is handy to operate and has a compact and smart shape.

The present invention further has an object to provide a waterproof ring that is hard to twist even with an increased ring diameter, and is manufactured at a low cost, as well as provides a sufficient water shielding effect even where the contacting portion is flat.

DISCLOSURE OF THE INVENTION

A waterproof lens-fitted photo film unit of the present invention is comprised of a unit body containing a photo film and photographic mechanisms, and a waterproof case that covers the unit body in a watertight fashion and is provided with a shutter release mechanism. The photographic mechanisms include a shutter blade, a shutter driving member for causing the shutter blade to make an open-close movement, and an arresting member for arresting the shutter driving member at a cocked position. The unit body is formed with an opening for exposing the arresting member at least partly. The shutter release mechanism comprises an operation member that is provided on the waterproof case, and a releasing member that acts on the arresting member through the opening in cooperation with the operation member being operated, to release the arrestment of the shutter driving member by the arresting member, thereby causing the shutter blade to open and close.

According to the present invention, the releasing member provided inside the waterproof case acts directly on the arresting member through the opening of the unit body, to activate the shutter driving member. Therefore, the structure is simplified as compared to the case where the shutter button is pressed by the releasing member, making it possible to provide a compact waterproof lens-fitted photo film unit at a low cost.

Providing the operation member on the front side of the waterproof case and making the releasing member act on the arresting member through the opening that is formed through the front side of the unit body enable locating the releasing member in a lower position than the top side of the unit body, so it is possible to achieve a better appearance without any protrusion on the top side of the waterproof case.

According to a preferred embodiment of the present invention, the operation member is affixed to an end of a rotary shaft that is inserted in a hole formed through the front wall of the waterproof case, and the releasing member is affixed to the other end of the rotary shaft. The rotary shaft is formed integrally with the operation member from plastics, and the above other end consists of a pair of arms extending in parallel to an axial direction. Each arm has an engaging claw protruding radially outward from its peripheral surface. As the pair of arms are inserted from the front side into the above hole while being bent toward each other, the engaging claws are engaged with inside surface of the front wall of the waterproof case by virtue of resiliency of the arms. Thereby, the rotary shaft is stopped from slipping off. The releasing member is affixed to tips of the arms. Then, the arms can bend only in a limited amount. Thus, it is possible to assemble these members without any cumbersome works such heat caulking or riveting.

A waterproof ring of the invention is characterized by comprising a curved surface portion and at least a flat surface portion, having a substantially semicircular sectional contour, and being provided with a ridge on the flat surface portion that is on the opposite side from the curved surface portion. According to this configuration, even if the member the waterproof ring is brought into contact with is flat, contact pressure is not distributed, so a reliable water shielding effect is provided. Because it is unnecessary to provide a ridge on the member in which the semi-cylindrical type waterproof ring is to be mounted, the member becomes easier to form, so it is possible to cut the manufacturing cost while improving reliability on the water shielding effect.

Shaping the curved surface portion to have a sectional contour that forms an arc with a constant radius, and locating a center of the arc at a summit of a sectional contour of the ridge, the waterproof ring keeps a constant thickness inside a gap in which the waterproof ring is nipped, even if the waterproof ring turns around. Thus, water shielding effect is stabilized.

Shaping the ridge of the waterproof ring to have an arc-shaped sectional contour at least around the summit contributes to improving assembling adaptability in addition to the above effects, because it becomes unnecessary to fix the inserting direction of the waterproof ring.

PREFERRED EMBODIMENTS OF THE PRESENT INVENTION

The present invention will be described in more detail with reference to the accompanying drawings.

Figure 1:
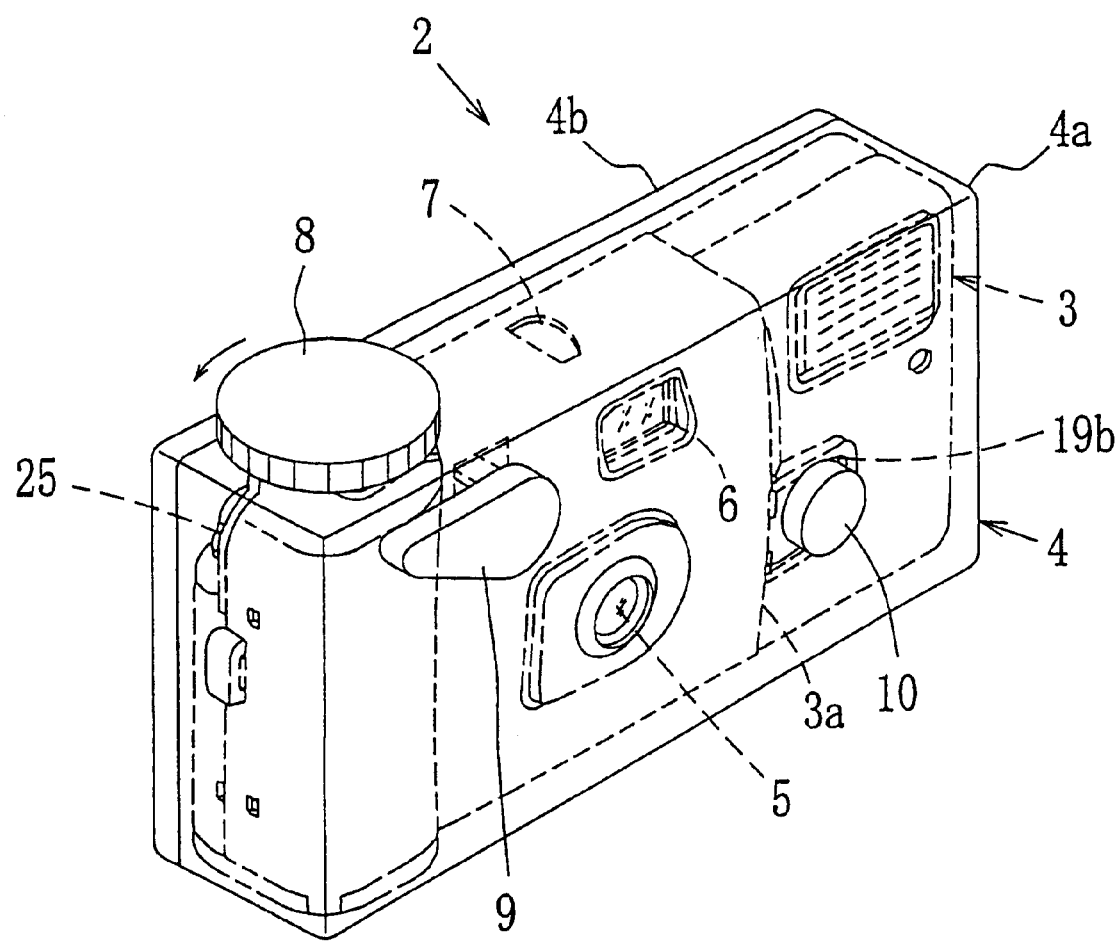
FIG. 1 is a perspective view illustrating an appearance of a waterproof lens-fitted photo film unit according to a first embodiment of the present invention.

As shown in FIG. 1, a waterproof lens-fitted photo film unit 2 consists of a unit body 3 incorporated with photographic mechanisms having a taking lens 5, a finder objective window 6, a film counter window 7 and other elements exposed to the outside, and a parallelepiped waterproof case 4 that contains the unit body 3 in a watertight fashion.

The waterproof case 4 consists of a case main body 4a that is made of a transparent plastic and accepts the unit body 3 from its rear side opening, and a lid 4b that closes the rear side opening of the case main body 4a. A decoration label 3a adhering to a center belt-like zone of the unit body 3 is displayed through the case main body 4a. It is possible to decorate the unit body 3 with a paper box instead of the decoration label 3a.

A winding dial 8 is provided on a top side of the waterproof case 4, and is rotated for film-winding by one frame. A shutter release operation member 9 and a push button type flash operation member 10 are provided on a front side of the waterproof case 4 in a watertight fashion. The shutter release operation member 9 is operated by hanging a finger on its operation end 9a and pushing down by the finger.

Figure 2:
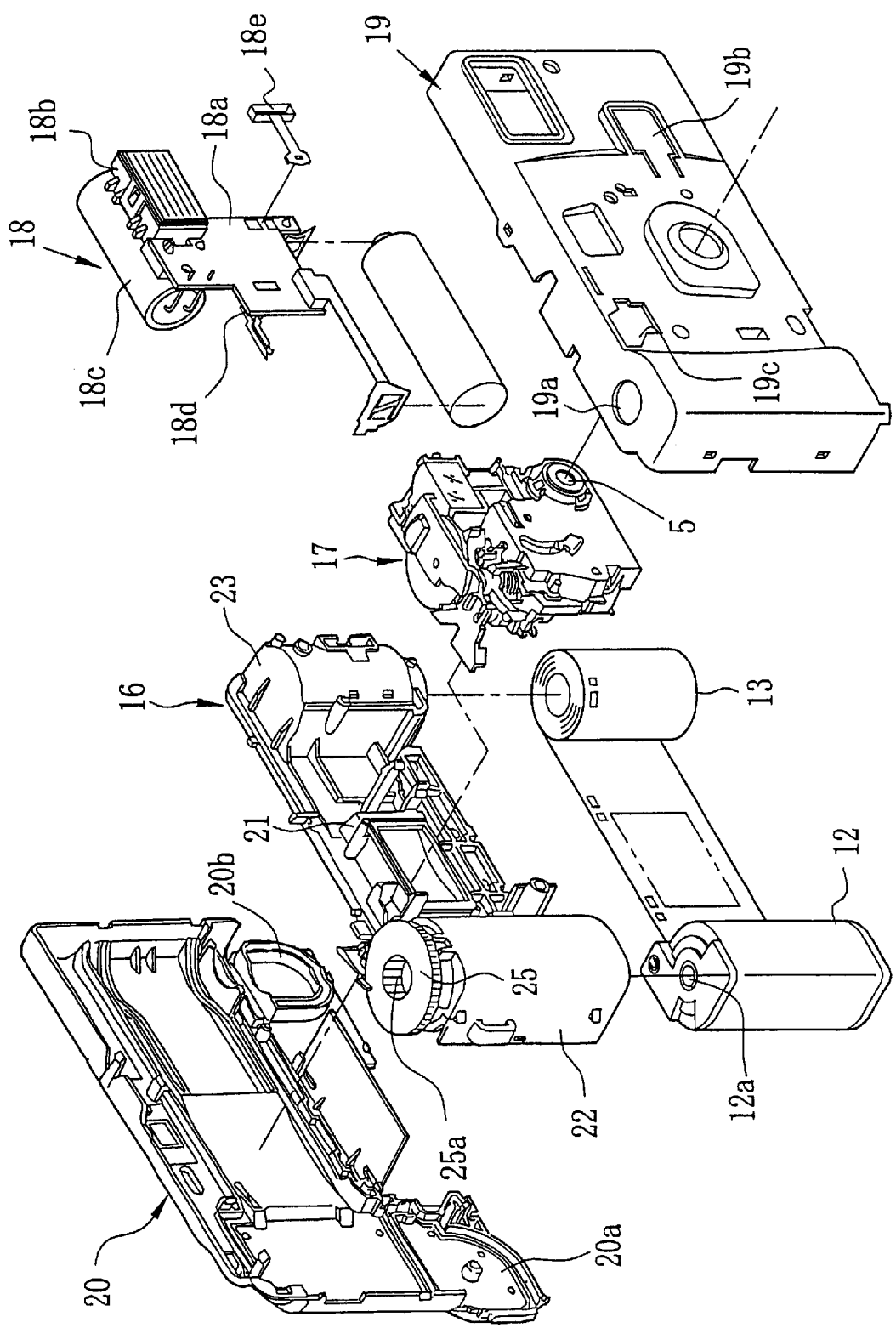
FIG. 2 is an exploded perspective view of a unit body of the waterproof lens-fitted photo film unit of the first embodiment.

As shown in FIG. 2, the unit body 3 is constituted of a body basic portion 16 containing a cartridge main body 12 and a photo film 13, an exposure unit 17, a flash unit 18, a front cover 19, a rear cover 20 and other members.

The exposure unit 17 is fastened by hooks to a light-shielding barrel 21 that is provided in the center of the body basic portion 16. The cartridge shell 12 and the photo filmstrip 13, that is pulled out from the cartridge shell 12 and is coiled into a roll, are respectively contained in a cartridge chamber 22 and a film roll chamber 23 which are provided on the opposite sides of the light-shielding barrel 21. The rear cover 20 is fastened by hooks to a rear side of the body basic portion 16 to cover these chambers from their rear sides, and bottom openings of these chambers are closed light-tightly with bottom lids 20a and 20b of the rear cover 20.

The flash unit 18 is constituted of a flash light projector 18b, a main capacitor 18c, a synchronizing switch 18d and other elements which are mounted to a circuit board 18a having a flash circuit thereon. The flash unit 18 is fastened by hooks to a front side of the body basic portion 16 on the side of the film roll chamber 23, and the front cover 19 is fastened by hooks to the front side of the body basic portion 16 to cover the flash unit 18 and the exposure unit 17.

A winding knob 25 is disposed above the cartridge chamber 22, and has a shaft engaged with an end of a spool 12a of the cartridge shell 12. The winding dial 8 has a shaft that is put through a top wall of the waterproof case 4, and a hole 19a formed through a top side of the front cover 19, and is engaged in a hole 25a that is formed on a top side of the winding knob 25. According to this configuration, rotating the winding dial 8 in a winding direction as shown by an arrow causes the spool 12a to rotate together with the winding knob 25, thereby to wind the photo filmstrip 13 into the cartridge shell 12. It is possible to provide a gear on a rear side of the waterproof case 4 to transmit rotation of the winding dial 8 to the winding knob 25 through the gear.

A flash charge start button 19b is formed integrally with a front wall of the front cover 19, and is pressed by pressing the flash operation member 10. Then an electric contact strip 18e is brought into contact with a pair of contacts on the circuit board 18, to connect them electrically, so the flash circuit is turned on to charge the main capacitor 18c.

Figure 3:
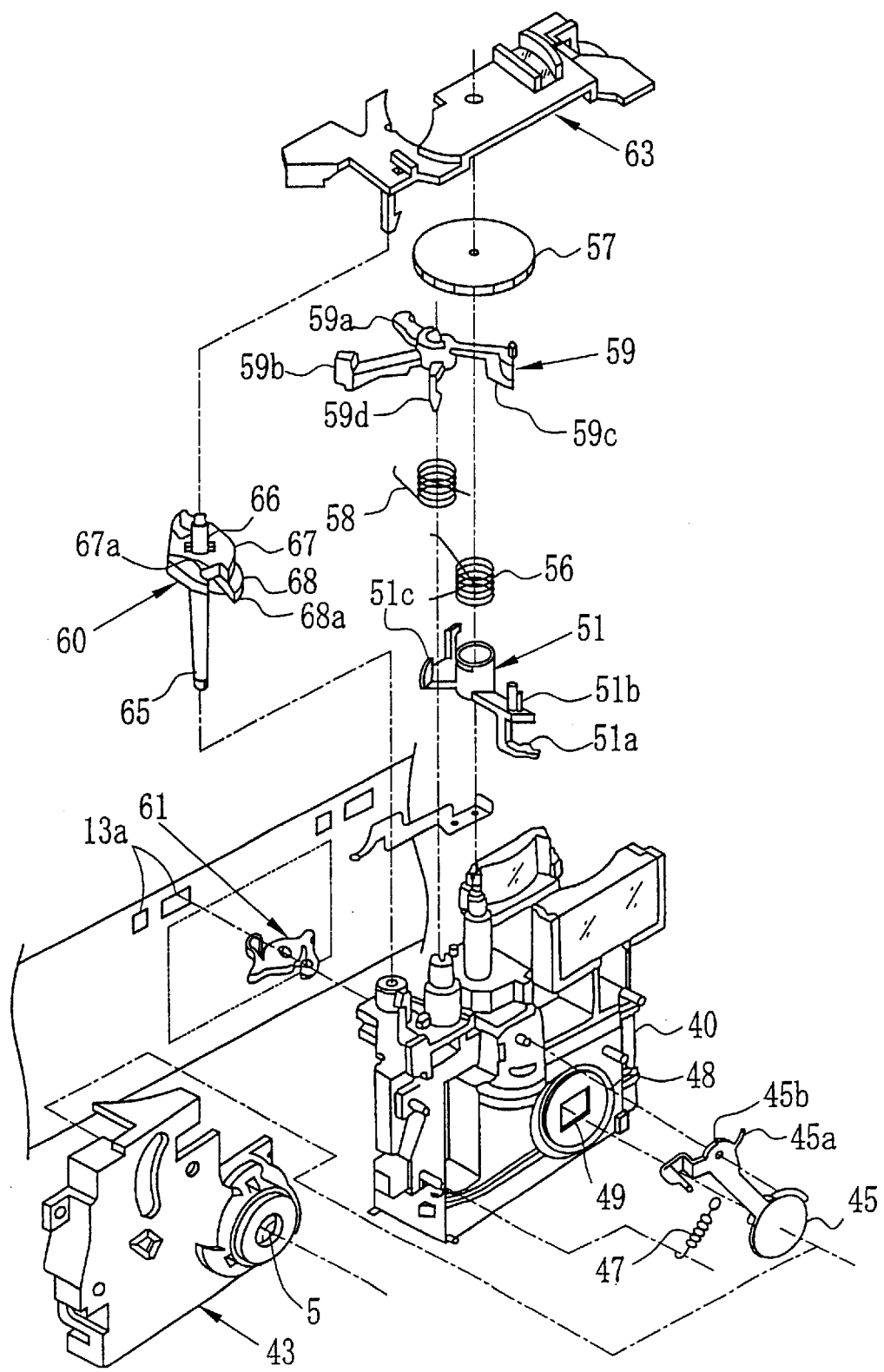
FIG. 3 is an exploded perspective view of photographic mechanisms of the waterproof lens-fitted photo film unit of the first embodiment.

In FIG. 3, the exposure unit 17 is an integral unit having elements of the photographic mechanism mounted on a base member 40. Instead of providing the integrated exposure unit 17, it is possible to mount the elements of the photographic mechanisms directly on the body basic portion 16. A lens holder 43 for holding the taking lens 5 is mounted on a front side of the base member 40, and a shutter blade 45 is pivotally mounted in between the lens holder 43 and the base member 40.

The shutter blade 45 is urged by a coiled spring 47 to rotate in a counterclockwise direction, and closes a shutter aperture 49 that is formed through the base member 40, in a closed position where the shutter blade 45 is in contact with an arc-shaped projection 48. When the shutter blade 45 moves to an open position to open the shutter aperture 49, a projection 45a comes to contact with the synchronizing switch 18d of the flash unit 18, short-circuiting it. When the synchronizing switch 18d is short-circuited, the flash light projector 18b projects a flash of light.

On a top side of the base member 40 are mounted a shutter drive member 51, a spring 56, a frame counter disc 57, a spring 58, an arresting member 59, a cam member 60 and so forth. On a rear side of the base member 40 is mounted a sprocket 61 through a shaft 65 of the cam member 60. These members are held by a top plate 63 that is mounted above the base member 40. The cam member 60 has a counter drive shaft 66, a winding-stop cam 67 and a shutter charging cam 68 as an integral part.

The sprocket 61 is engaged in perforations 13a of the photo film 13, so the sprocket 61 rotates as the photo film 13 is conveyed by rotating the winding wheel 8, and thus the cam member 60 rotates along with the rotation of the sprocket 61. When the photo filmstrip 13 is advanced by one frame, the cam member 60 has made a half revolution, and a groove 67a of the winding stop cam 67 reaches a position facing a claw portion 59a of the arresting member 59. Then, the arresting member 59 rotates slightly in a clockwise direction according to the force of the spring 58, letting the claw portion 59a into the groove 67a, and thus interrupting the film advancement. Simultaneously, a winding stop claw 59b is engaged in gears of the winding knob 25, preventing it from being wound in the winding direction. That is, the winding knob 25 is set in a film winding stop condition.

When the shutter charge cam 68 makes a half revolution with a half revolution of the cam member 60, a blade-like projection 68a of the shutter charge cam 68 pushes a projection 51a of the shutter drive member 51, causing the shutter drive member 51 to rotate clockwise against the force of the spring 56. As a result, an arresting projection 59c that is protruded downward from the arresting member 59 and an arrested projection 51b that is protruded upward from the shutter drive member 51 are brought into contact with each other and engaged with each other. Thus the shutter drive member 51 is arrested in a cocked position by the arresting member 59.

As set forth in detail later, when a leg 59d extending downward from the arresting member 59 is pushed by a shutter release mechanism that is provided on the waterproof case 4, and thus the arresting member 59 rotates counterclockwise, the arresting projection 59c is disengaged from the arrested projection 51b. Then the shutter drive member 51 rotates counterclockwise according to the force of the spring 56, so a kick blade 51a of the shutter drive member 51 kicks an end 445b of the shutter blade 45. Thereby, the shutter blade 45 rotates clockwise to open the shutter aperture 49, exposing the photo filmstrip 13. The shutter blade 45 returns to the position closing the shutter aperture 49, according to the force of the coiled spring 47.

Figure 4:
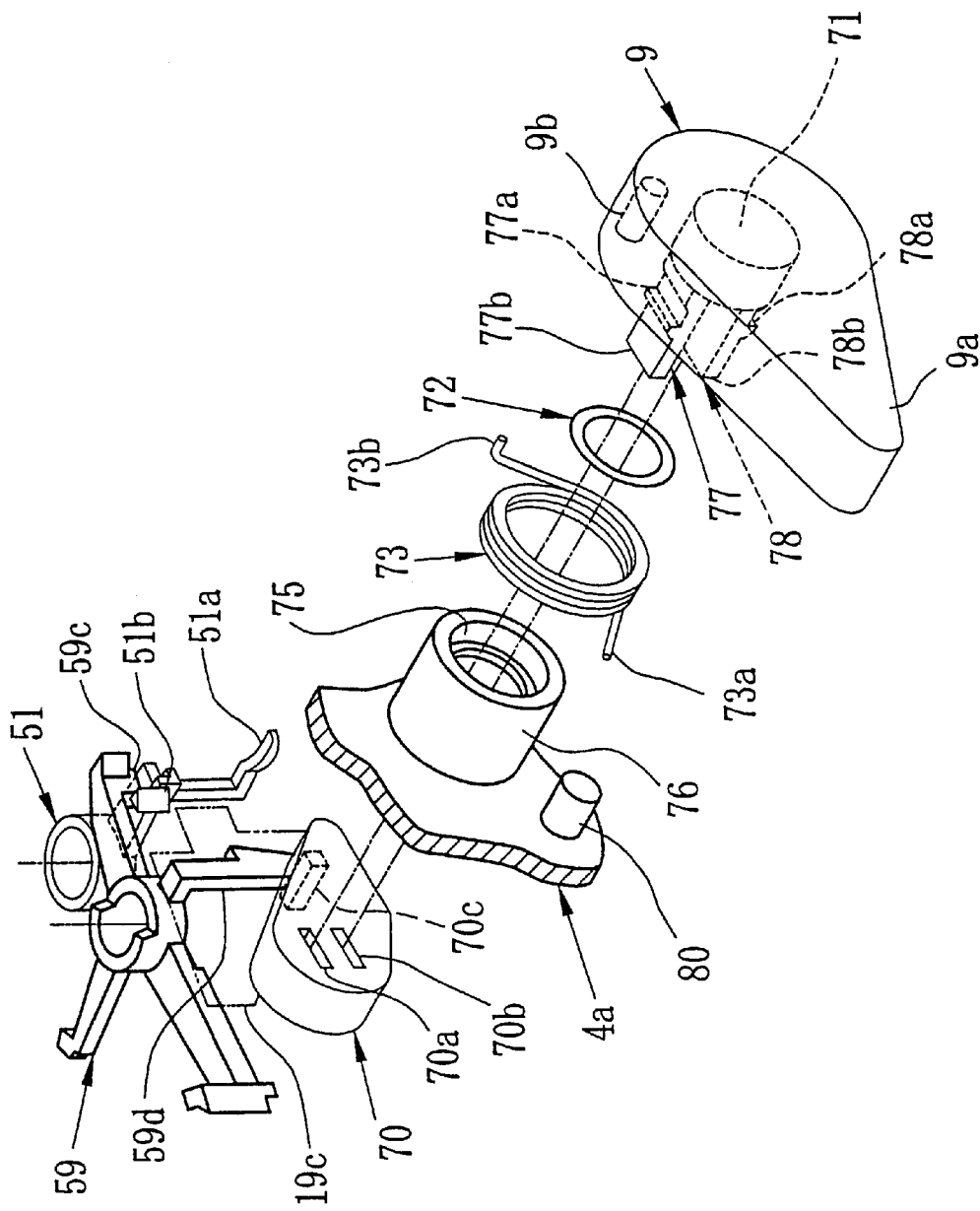
FIG. 4 is an exploded perspective view of a shutter release mechanism provided on a waterproof case of the waterproof lens-fitted photo film unit of the first embodiment.
Figure 5:
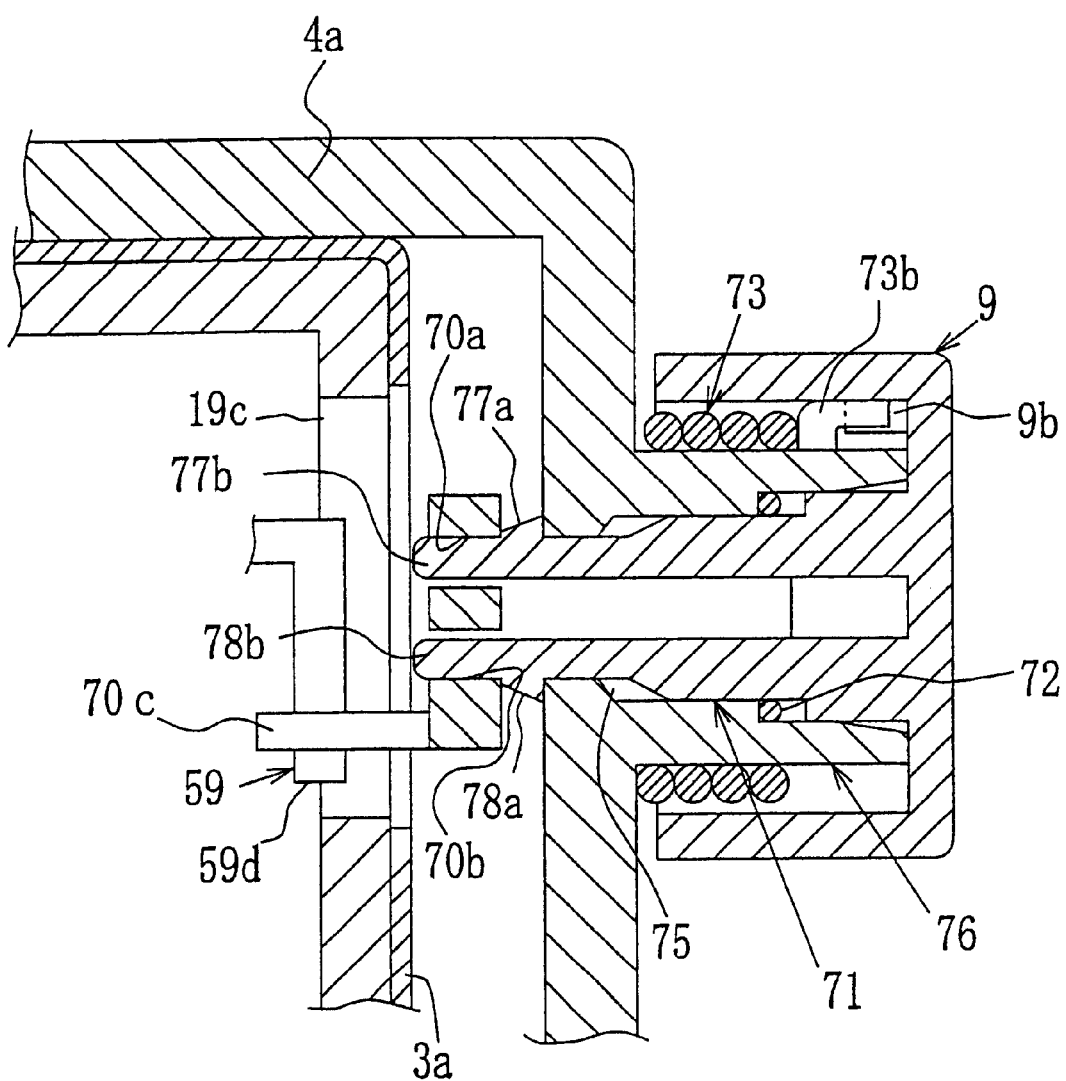
FIG. 5 is a sectional view of the shutter release mechanism of FIG. 4.

As shown in FIGS. 4 and 5, the shutter release mechanism provided on the waterproof case 4 is constituted of a release lever 70 engaged with a rotary shaft 71 of the shutter release operation member 9, an O-ring 72, a spring 73 and other members, in addition to the shutter release operation member 9. A hole 75 is formed through a front wall of the waterproof case 4, and a hub 76 is formed around the hole 75 to protrude forward. A rubber O-ring 72 is fitted in the hub 76. The rotary shaft 71 is inserted in the hub 76 and is able to rotate therein. The rotary shaft 71 is protruded into the waterproof case 4 through the hole 75. The rotary shaft 71 closes the front of the hub 76 and stops the O-ring 72 from removing. The O-ring 72 prevents water and dust from entering the waterproof case 4 through the hole 75.

The rotary shaft 71 consists of a pair of arms 77 and 78 extending in parallel to the axial direction of the rotary shaft 71, and is formed integrally with the shutter release operation member 9 from plastics. A claw 77a or 78a is integrally formed on an outer peripheral surface of each arm 77 or 78. The claws 77a and 78a are engaged with the rim of the hole 75 inside the front wall of the waterproof case 4, to fasten the rotary shaft 71 to the waterproof case 4. Tips 77b and 78b of the arms 77 and 78 are force-fitted in key holes 70b and 70c of the release lever 70, fastening the release lever 70 to the tip of the rotary shaft 71.

A spring 73 is fitted on the hub 76, and is covered with the shutter release operation member 9. A protrusion 80 is provided on the front side of the waterproof case 4 in the vicinity of the hub 76, and is located inside the operation end 9a of the shutter release operation member 9. One end 73a of the spring 73 is hooked on the protrusion 80, and the other end 73b is hooked on a pin 9b that is provided inside the shutter release operation member 9. The spring 73 urges the shutter release operation member 9 in the clockwise direction, so an inner surface of a bottom side wall of the operation end 9a is pressed against the protrusion 80. To take a photograph, the shutter release operation member 9 is pushed down till an inner surface of a top side wall of the operation end 9a comes to contact with the protrusion 80. As the finger removes, the shutter release operation member 9 returns to the initial position.

An opening 19c is formed through the front side of the front cover 19, for exposing the leg 59d of the arresting member 59 and the arrested projection 51b of the shutter drive member 51. The release lever 70 has an eccentric end portion 70c that is extended in the axial direction such that the end portion 70c is protruded into the opening 19c and is located closely on the left side of the leg 59d when the unit body 3 is contained in the case main body 4a. Since the end portion 70c of the release lever 70 is located inside the unity body 3 through the opening 19c, the thickness of the waterproof case 4 can be reduced.

When the operation end 9a of the shutter release operation member 9 is pushed down after the shutter drive member 51 is cocked by winding up the film by one frame, the release lever 70 rotates in the counterclockwise direction together with the rotary shaft 71, so the end portion 70c of the release lever 70 directly pushes the leg 59d to disengage the engaging projection 59c of the arresting member 59 from the engaged projection 51b of the shutter drive member 51, thereby activating the shutter drive member 51 to make an exposure.

In this way, the release lever 70 that is the release member for releasing the shutter mechanism directly pushes the arresting member 59 through the opening 19c of the front of the unit body 3, so it comes to be possible to locate the release member at a position lower than the top surface of the unit body 3. Accordingly, the waterproof case 4 gets a neat appearance with no protuberance on the top side. Besides, as the end portion 70c of the release lever 70 is inserted in the unit body 3 through the opening 19c, the thickness of the waterproof case 4 can be reduced.

The shutter release mechanism of the waterproof case 4 is assembled in the following sequence. First, the O-ring 72 is fitted in the hub 76, and the spring 73 is fitted on the hub 76. Thereafter, the rotary shaft 71 of the shutter release operation member 9 is plugged into the hub 76 from its front side, while hanging the ends 73a and 73b of the spring 73 on the protrusion 80 and the pin 9b. At that time, the arms 77 and 78 of the rotary shaft 71 are thrust into the O-ring 72 and the hole 75 while being bent to close their tips 77b and 78b to each other. When the claws 77a and 78a of the arms 77 and 78 are put through the hole 75, the arms 77 and 78 resiliently return to their initial position, so the claws 77a and 78a are hooked on the inside of the front wall of the waterproof case 4. Thus, the rotary shaft 71 is easily stopped from removing. As the rotary shaft 71 plugs the hub 76 watertight, water will not enter the waterproof case 4 through the hole 75. Since the shutter release operation member 9 is formed integrally with the rotary shaft 71, a process for attaching the shutter release operation member 9 is not needed. Next, the tips 77b and 78b of the arms 77 and 78 are force-fitted in the key holes 70a and 70b of the release lever 70 to affix the release lever 70. Thereby the arms 77 and 78 are stopped from bending, ensuring the anti-removal of the rotary shaft 71 and also preventing the arms 77 and 78 from twisting. In this way, the shutter release mechanism can be assembled without the need for cumbersome works, like heat caulking or riveting. So the number of parts as well as the number of assembling processes may be reduced.

Figure 6:
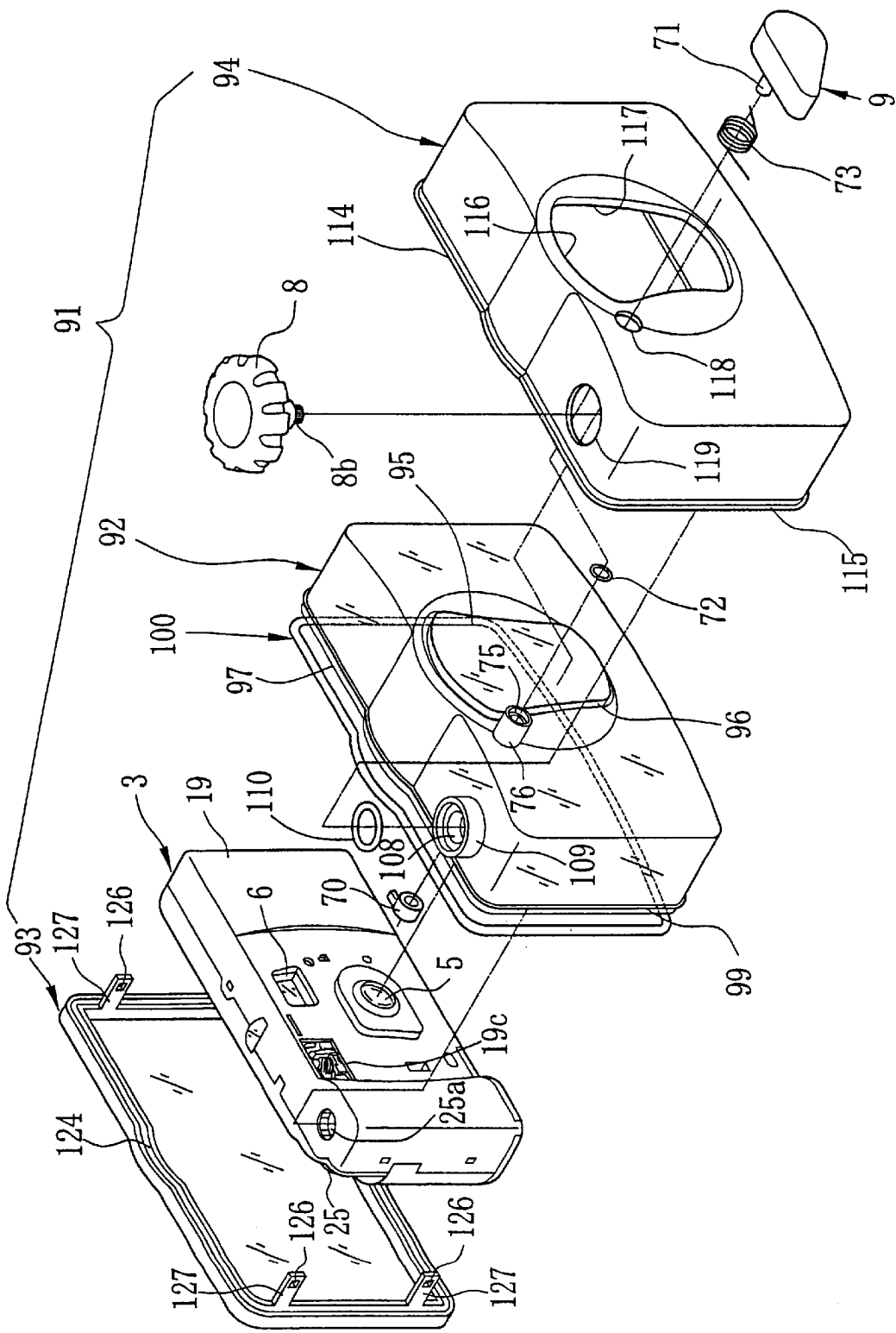
FIG. 6 is an exploded perspective view of a waterproof case of the waterproof lens-fitted photo film unit of a second embodiment of the present invention.

In FIG. 6 showing a waterproof lens-fitted photo film unit according to the second embodiment of the present invention, a waterproof case 91 consists of a front case member 92 that is put on a unit body 3 from the front side to cover front, top, bottom and opposite lateral sides of the unit body 3, a rear case member 93 that is mounted to the front case member 92 from the rear side of the unit body 3, and a waterproof cover 94 that is put on the outside of the front case member 92.

The front case member 92 is formed from a transparent plastic, and has an exposing section 95 on its front side for exposing a taking lens 5 and a finder objective window 6 of the unit body 3 to outside. A groove 96 is formed around the circumference of the exposing section 95. The rear side of the front case member 92 is made to be an open end for accepting the unit body 3. Around the circumference of the open end 97, a grant 98 for fitting a waterproof ring 100 therein and a ridge 99 are formed integrally with the front case member 92 (see FIG. 7).

Figure 8:
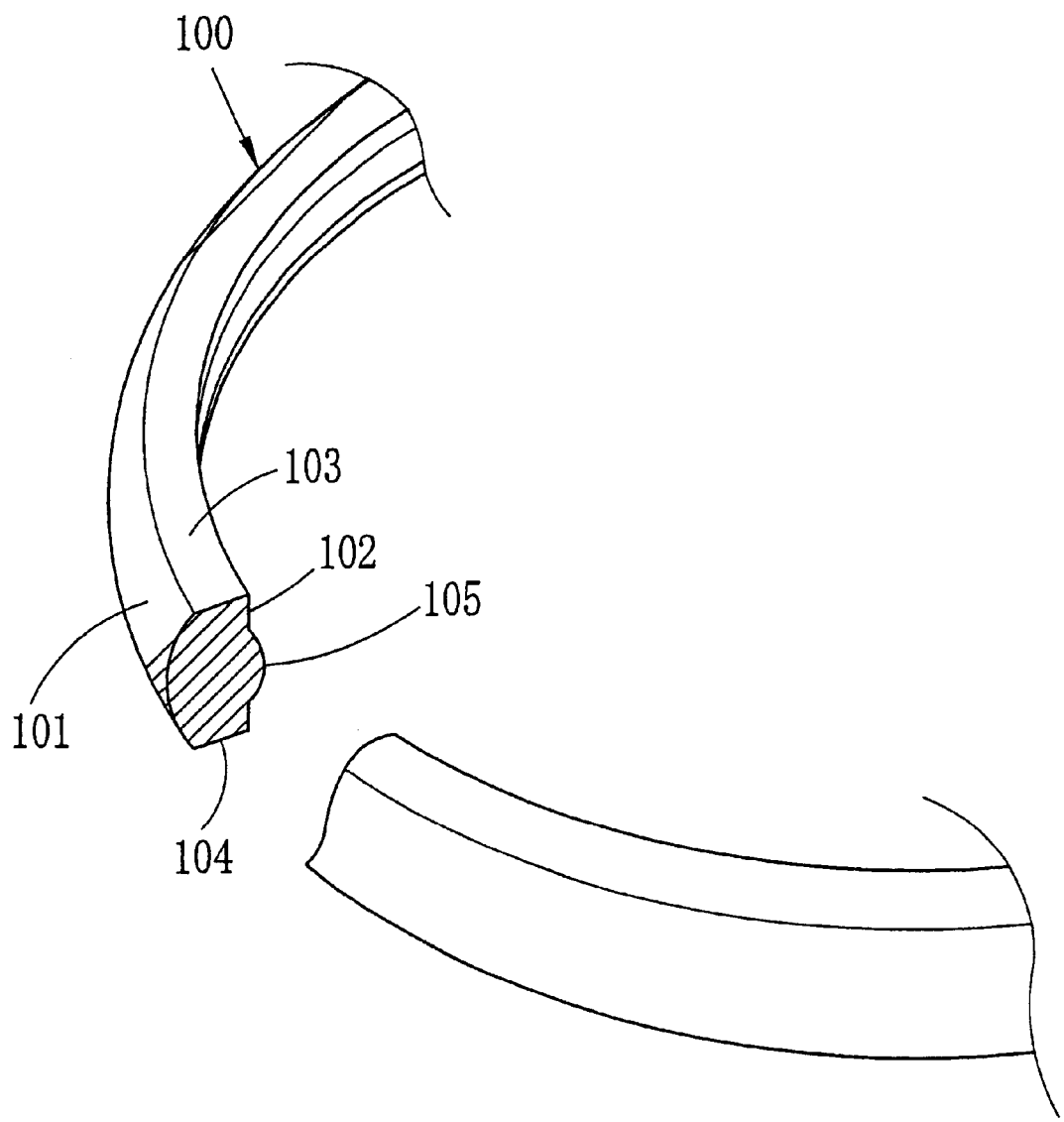
FIG. 8 is a perspective view of a semi-product for the waterproof ring.

As shown in FIG. 8, the waterproof ring 100 is a semi-cylindrical type waterproof ring 100 whose section has a substantially semi-circular shape consisting of an outer surface section 101 having an arc-shaped profile, and flat inner, top and bottom surface sections 102, 103 and 104. A ridge 105 having an arc-shaped profile is provided on a middle position of the inner surface section 102. As the material for forming the semi-cylindrical type waterproof ring 100, an ordinary rubber is used, but any other elastic material is usable insofar as it has proper waterproof properties. Since the semi-cylindrical type waterproof ring 100 has the flat inner, top and bottom surface sections 102, 103 and 104, it is inapt to twist even where the ring has a large diameter. So the semi-cylindrical type waterproof ring 100 is superior in assembling facility. Because the ridge 105 with the arc-shaped profile is pressed against a bottom surface of the grant 98 that is formed around the outer periphery of the open end 97, contacting pressure of the waterproof ring 100 onto the bottom surface of the grant 98 is not distributed even through the bottom surface is flat. Accordingly, the waterproof ring 100 is kept in tight contact with the front case member 92. Since it is not necessary providing a ridge on the bottom surface of the grant 98 for the purpose of preventing pressure distribution, the front case member 92 is easy to form.

Figure 9:
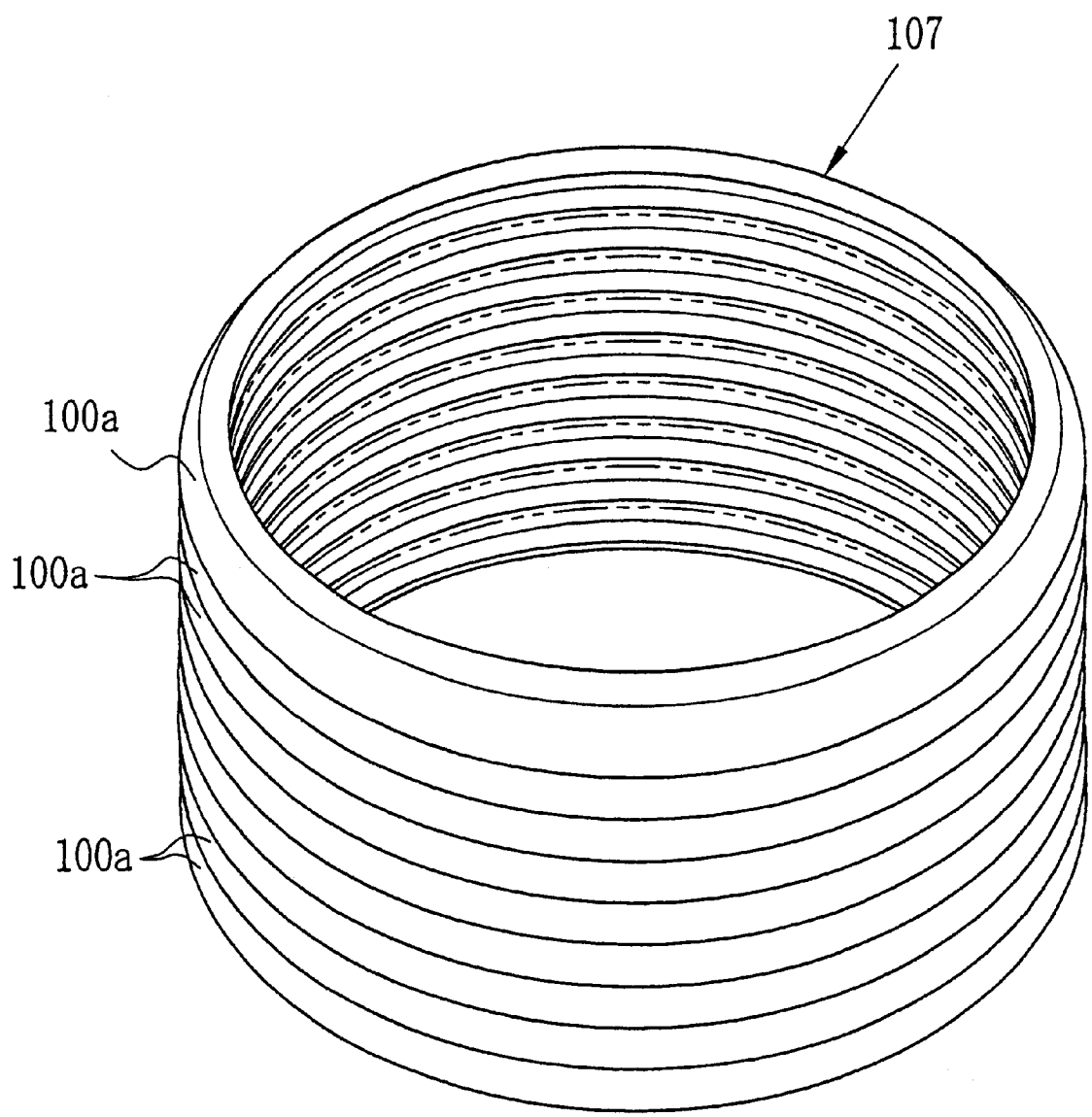
FIG. 9 is a sectional view of a joint portion of the waterproof case using the waterproof ring.

Moreover, as shown in FIG. 9, the semi-cylindrical type waterproof ring 100 may be produced by cutting the individual waterproof ring 100 off a semi-formed product 107 of a cylindrical tubular shape that consists of a number of semi-produced waterproof rings 100a piled up in the direction of thickness. Therefore, the semi-cylindrical type waterproof ring 100 is easy to mass-produce and thus manufactured at a low cost.

As shown in FIG. 6, a hole 75 is formed through a front wall of the front case member 92, and a hub 76 is formed to protrude from around the hole 75. An O-ring 72 is fitted in the hub 76. A rotary shaft 71, the rotational center of a shutter release operation member 9, is inserted in the hub 76 so as to be able to rotate therein, and a tip of the rotary shaft 71 is put through the hole 75 into the waterproof case 91. A release lever 70 is attached to the tip of the rotary shaft 71. When a unit body 3 is accommodated in the front case member 92, the release lever 70 is put into an opening 19c that is formed through the front of a front cover 19, and is engaged with the shutter mechanism of the exposure unit. So the shutter mechanism is actuated by operating the shutter release operation member 9 to swing. A coiled spring 73 is mounted on the periphery of the hub 76, to urge the shutter release operation member 9 in a clockwise direction in the drawing, so that the shutter release operation member 9 is always returned to its initial position.

On the top side of the front case member 92 is provided a upward protruding hub 109, to which a winding dial 8 is rotatably mounted. A shaft 8b of the winding dial 8 is inserted through a hole 108 of the hub 109 into the waterproof case 91, and is engaged in an engaging hole 25a of a winding knob 25 through an opening formed through the front cover 19 of the unit body 3.

The waterproof cover 94 is formed from a semi-transparent elastomer, a high-polymer with elasticity, and has a corresponding shape to the front case member 92, but is slightly larger than the front case member 92 so that the waterproof cover 94 may be tightly fitted on the outside of the front case member 92. The waterproof cover 94 has an opening 116 formed through its front side, for uncovering the exposing section 95 that is formed on the front side of the front case member 92. A ridge 117 is formed through around the rim of the opening 116, and is protruded toward the front case member 92. The ridge 117 is made slightly larger in width than the groove 96 of the front case member 92, and is crushed into the groove 96, so that the ridge 117 is kept in tight contact with the inner walls of the groove 96, making joint between the waterproof cover 94 and the front case member 92 watertight.

The waterproof cover 94 also has openings 118 and 119 on its front and top sides, for exposing the hubs 76 and 109 of the front case member 92. Because the openings 118 and 119 are smaller than the opening 116, and rarely remove off the surface of the front case member 92, any water-shielding device, such as the ridge 117 around the opening 116 and the groove 96, is not provided around the openings 118 and 119.

Figure 7:
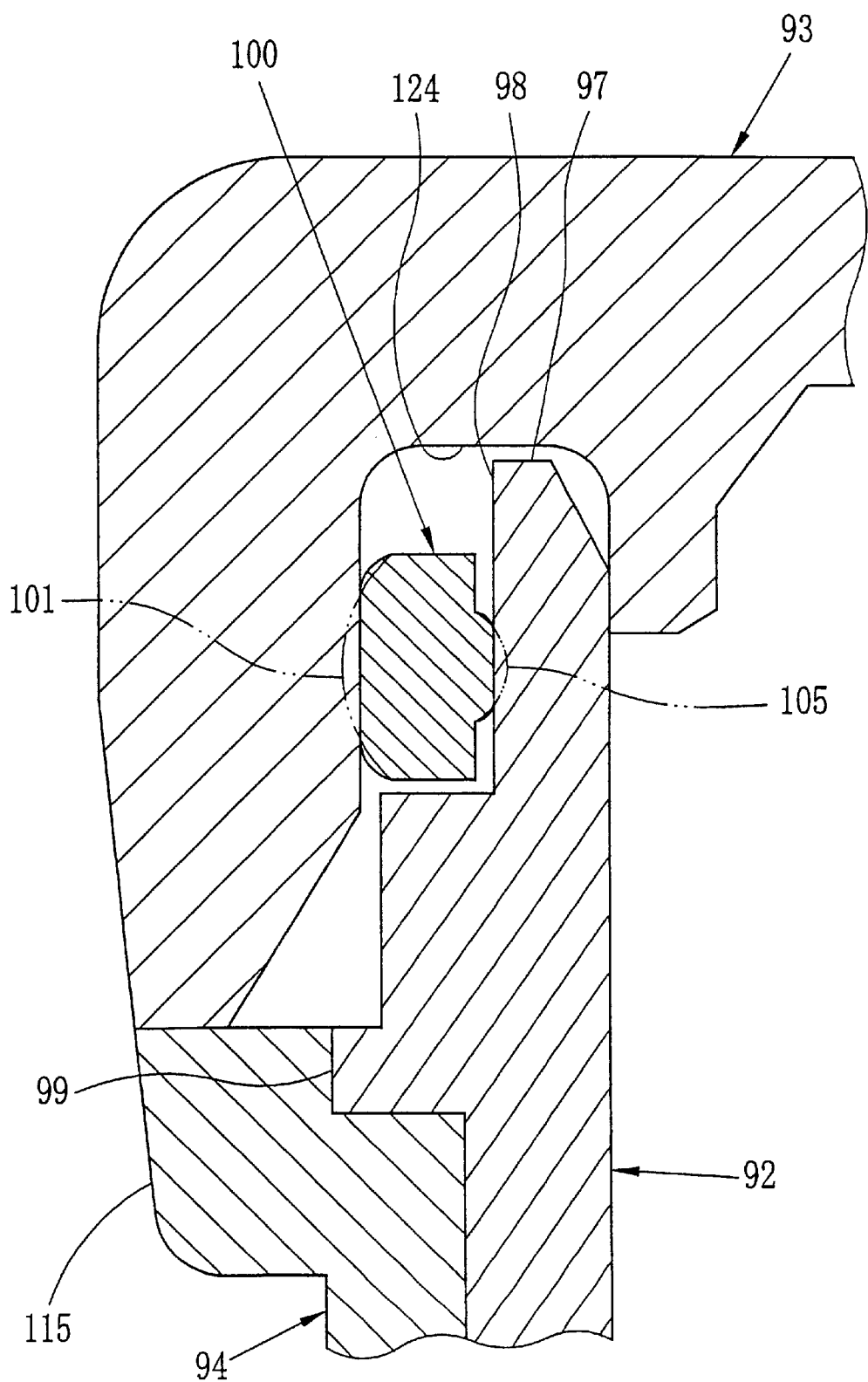
FIG. 7 is a perspective view, partly in section, of a waterproof ring according to the present invention.

The rear side of the waterproof cover 94 is formed as an open end 114 for permitting putting the waterproof cover 94 on the front case member 92. A brim 115 is integrally formed around the entire circumference of the open end 114. The brim 115 is put on the outside of the ridge 99 of the front case member 92, as shown in FIG. 7.

The rear case member 93 is formed from a transparent plastic, so a not-shown finder window of the unit body 3 may be viewed from outside the rear case member 93. A groove 124 is formed on the front side of the rear case member 93 around its entire circumference, and the open end 97 of the front case member 92 is inserted in this groove 124. The groove 124 has a width that is slightly less than a total thickness of the open end 97 and the waterproof ring 100 covering the outside of the outer periphery of the open end 97. Accordingly, when the open end 97 is inserted into the groove 124, the outer surface section 101 and the ridge 105 of the waterproof ring 100 are depressed, and thus brought into tight contact with the inner walls of the groove 124 and the bottom surface of the grant 98 as well, ensuring water-tight joint between the front and rear case members 92 and 93.

A pair of strips 127 are provided on the front of either horizontal side of the rear case member 93. The strips 127 are each formed with an engaging hole 126, and are engaged with engaging claws that are not-shown but formed on inside of side walls of the front case member 92. Through this engagement, the rear case member 93 is securely fastened to the front case member 92.

Figure 10:
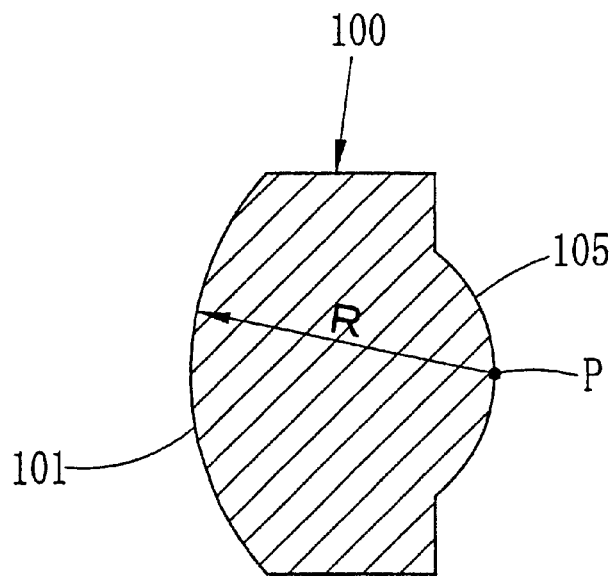
FIG. 10 is a sectional view of a waterproof ring according to another embodiment.

As shown in FIG. 10, the outer surface portion 101 of the semi-cylindrical type waterproof ring 100 preferably forms an arc in profile that is formed around a summit P of the ridge 105 with a radius R. According to this configuration, if the waterproof ring 100 turns round as it is mounted, the thickness of the waterproof ring 100 would not change in between the case members 92 and 93, so the contact pressure of the waterproof ring 100 is kept constant, providing stable water-shielding effects. Although the ridge 105 is entirely arc-shaped in profile in the illustrated embodiment, the same effect is provided by a ridge which is arc-shaped in profile at least around its peak.

Figure 11:
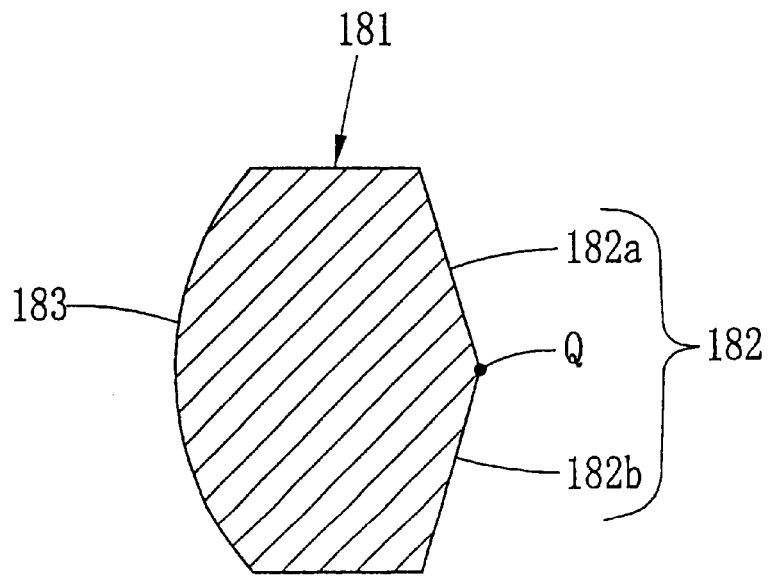
FIG. 11 is a sectional view of a waterproof ring according to still another embodiment.

As shown in FIG. 11, a semi-cylindrical type waterproof ring 181 may have an inner surface portion 182 of a roof-shape that consists of a pair of gently sloped surfaces 182a and 182b. Because being easy to remove from the metal mold, the waterproof ring of this shape is preferable in view of forming. Shaping an outer surface portion 183 to be an arc in profile that is formed about a peak Q of the inner surface portion 182 provides the same effects as the waterproof ring 100 of FIG. 10.

In the above described embodiment, the ridge is provided on the flat inner surface of the semi-cylindrical waterproof ring. But it is possible to provide a flat surface portion on the outside of the waterproof ring, and provide a ridge on this flat surface portion. The ridge on the flat surface portion may have a triangular, trapezoidal or rectangular profile.

The structure of the shutter-release mechanism mounted to the waterproof case is not to be limited to the above described structure, insofar as it acts directly on the arresting member through an opening of the film unit. For example, it is possible to provide a shutter release operation member and a release lever which may rotate about parallel axes to each other, and couple these axes to each other through gears. It is alternatively possible to provide a release member on a tip of a push-type operation member. The location of the operation member is not limited to the front of the waterproof case, but the operation member may be located on the top, rear or side portion of the waterproof case, in correspondence with the location of the opening that exposes the arresting member at least partly.

Although the front case member constitutes a case main body, and a rear case member constitutes a lid for closing the open end of the case main body in the waterproof case used in the illustrated embodiments, it is not necessary to limit the waterproof case to this configuration. For example, the waterproof case may be constituted of a front case half and a rear case half. The waterproof case may also be constituted of those parts which cover the unit main body from the top and bottom.

Thus, the present invention is not to be limited to the above embodiments, but various modification will be possible without departing from the scope of claims.

INDUSTRIAL APPLICATION FIELD

The present invention is preferably applicable not only to the waterproof lens-fitted photo film units, but also to the compact cameras. The semi-cylindrical type waterproof ring of the present invention is preferable not only for use in waterproof cases of the waterproof lens-fitted photo film units, but also for use as a waterproof ring in a fitting joint between parts of any kind, such as a fitting joint in a housing of a waterproof camera.

What is claimed is:

1. A waterproof lens-fitted photo film unit comprising:
   a unit body containing a photo film and photographic mechanisms, said photographic mechanisms comprising:
   a shutter blade,
   a rotatable shutter driving member for causing said shutter blade to make an open-close movement, and
   a rotatable arresting member positioned to make contact with and arrest said shutter driving member at a cocked position;
   a waterproof case that covers said unit body in a water-tight fashion;
   an opening formed through said unit body;
   an operation member mounted on and put through said waterproof case such that said operation member may be operated from outside of said waterproof case; and
   a releasing member mounted to said operation member inside said waterproof case, wherein a tip of said releasing member is inserted into said unit body through said opening, and is in direct contact with said arresting member inside said unit body when said operation member is operated, thereby to release said shutter driving member from arrestment of said arresting member, and cause said shutter blade to make said open-close movement.

2. A waterproof lens-fitted photo film unit as recited in claim 1, wherein said opening is formed through a front side of said unit body, and said operation member is provided on the front side of said waterproof case.

3. A waterproof lens-fitted photo film unit as recited in claim 2, wherein said operation member is affixed to an end of a rotary shaft that is inserted in a hole formed through a front wall of said waterproof case, and said releasing member is affixed to the other end of said rotary shaft.

4. A waterproof lens-fitted photo film unit as recited in claim 3, wherein said rotary shaft is formed integrally with said operation member from plastics, and has a portion on said other end that is constituted of a pair of arms extending in parallel to an axial direction, each of said arms having an engaging claw protruding radially outward from a peripheral surface of said arm, wherein said arms are inserted from the front side into said hole formed through said front wall, while being bent toward each other, thereby to bring said engaging claws into engagement with inside surface of said front wall of said waterproof case by virtue of resiliency of said arms, and fasten said rotary shaft to said front wall in a rotatable fashion, and said releasing member is thereafter affixed to tips of said arms.

5. A waterproof lens-fitted photo film unit comprising:
   a unit body containing a photo film and photographic mechanisms;
   a waterproof case that covers said unit body in a water-tight fashion, said waterproof case consisting of a pair of case members which are joined to each other after being put over said unit body; and
   a waterproof ring formed from an elastic material disposed between said case members, the ring having first and second contact faces in contact with the respective case members, the first and second contact faces being arranged directly opposite one another, the first contact face having an arcuate shape in cross-section, the second contact face having a center arcuate section with an immediately adjacent flat section on either side in cross-section section.

6. The waterproof lens-fitted photo film unit of claim 5, wherein the immediately adjacent flat sections of the second contact face are coplanar.

7. The waterproof lens-fitted photo film unit of claim 5, wherein the arcuate cross-sectional shape of the first contact face has a radial center point that lies on a surface of the center arcuate section of the second contact face.

8. A waterproof lens-fitted photo film unit as recited in claim 5, further comprising a waterproof cover that covers said case members at least partly.

9. A waterproof lens-fitted photo film unit comprising:
   a unit body containing a photo film and photographic mechanisms;
   a waterproof case that covers said unit body in a water-tight fashion, said waterproof case consisting of a pair of case members which are joined to each other after being put over said unit body; and
   a waterproof ring formed from an elastic material disposed between said case members, the ring having first and second contact faces in contact with the respective case members, the first and second contact faces being arranged directly opposite one another, the first contact face having an arcuate shape in cross-section, the arcuate cross-sectional shape of the first contact face having a radial center point that lies on a surface of the second contact face.

10. The waterproof lens-fitted photo film unit of claim 9, wherein the second contact face has an arcuate shape in cross-section.

11. The waterproof lens-fitted photo film unit of claim 10, wherein the arcuate second contact face has an immediately adjacent flat section on either side.

12. The waterproof lens-fitted photo film unit of claim 9, wherein a second contact face comprises in cross-section two flat sections arranged at an oblique angle with respect to one another, the radial center point of the first contact face corresponding to a vertex of the two flat sections.

* * * * *